United States Patent
Bortoloni

[11] Patent Number: 5,826,949
[45] Date of Patent: Oct. 27, 1998

[54] VEHICLE WHEEL HAVING WEIGHT-REDUCING RIM

[76] Inventor: Andrea Bortoloni, 35027 Noventa Padovana, Padova, Italy

[21] Appl. No.: 969,109

[22] Filed: Nov. 12, 1997

Related U.S. Application Data

[63] Continuation of Ser. No. 641,881, May 2, 1996, abandoned.

[60] Provisional application No. 60/000,400 Jun. 21, 1995.

[51] Int. Cl.$^6$ .................................................. B60B 21/02
[52] U.S. Cl. .............................................. 301/97; 301/65
[58] Field of Search ................. 301/6.91, 6.31, 301/65, 95, 96, 97, 98

[56] References Cited

U.S. PATENT DOCUMENTS

| | | | |
|---|---|---|---|
| 340,612 | 4/1886 | Pierce et al. | 301/95 |
| 1,283,995 | 11/1918 | Walther | 301/6.7 |
| 1,363,519 | 12/1920 | Lachman | 301/63.1 |
| 2,291,156 | 7/1942 | Heesch et al. | 301/9 |
| 3,016,269 | 1/1962 | De Lorean | 301/6 |
| 3,498,678 | 3/1970 | Haley et al. | 301/63 R |
| 3,635,529 | 1/1972 | Nass | 301/65 |
| 3,859,704 | 1/1975 | Nasson | 29/159.01 |
| 3,910,638 | 10/1975 | Scott | 301/63 R |
| 4,035,895 | 7/1977 | Lester | 29/159.03 |
| 4,071,280 | 1/1978 | Davis | 301/65 |
| 4,361,358 | 11/1982 | Bonniwell et al. | 301/6 E |
| 4,420,190 | 12/1983 | Rohr | 301/63 R |
| 4,487,456 | 12/1984 | Zulauf | 301/63 R |
| 4,518,204 | 5/1985 | Takada | 301/63 R |
| 5,292,182 | 3/1994 | Kanazawa et al. | 301/65 |
| 5,415,464 | 5/1995 | Scott | 301/65 |
| 5,429,422 | 7/1995 | Baldi | 301/65 |

FOREIGN PATENT DOCUMENTS

| | | | |
|---|---|---|---|
| 2101541 A | 1/1983 | European Pat. Off. | 301/95 |
| 683524 | 6/1930 | France | 301/95 |
| 507873 | 9/1930 | Germany | 301/63.1 |
| 8914 | 1/1980 | Japan | 301/97 |
| 125851 | 5/1928 | Switzerland | 301/95 |
| 1131680 | 12/1984 | U.S.S.R. | 301/97 |
| 1530491 | 12/1989 | U.S.S.R. | 301/95 |
| 1555145 | 4/1990 | U.S.S.R. | 301/97 |
| 1601497 | 10/1981 | United Kingdom | 301/97 |

*Primary Examiner*—Russell D. Stormer
*Attorney, Agent, or Firm*—Fulwider Patton Lee & Utecht, LLP

[57] ABSTRACT

A wheel rim has spaced indentations in the rim to remove material from the rim and decrease wheel weight. The indentations may be elongated grooves, which are aligned with the axis of the wheel. The grooves are evenly spaced circumferentially about the wheel. Each groove's cross-section is an arc of a circle. The grooves extend into the rim more than one half of the rim's nominal thickness. The radius of the circle that form the cross-section is much larger than the groove's depth so that the edges of the grooves do not meet the rim's surface at a sharp angle. This intersection minimizes stress. The grooves may be in the rim's an inner or outer surfaces or in both surfaces. The application also discloses other configurations for the indentations.

5 Claims, 7 Drawing Sheets

VEHICLE WHEEL HAVING WEIGHT-REDUCING RIM

This application is a continuation of Ser. No. 08/641,881 filed May 2, 1996, abandoned and is a Provisional No. 60/000,400 filed Jun. 21, 1995.

BACKGROUND OF THE INVENTION

1. Field of the Invention

This invention relates to vehicle wheels and their rims.

2. State of the Art

Wheels must be designed to withstand stresses that occur during driving. In addition to the stress that occurs during normal driving on flat pavement, wheels also encounter much higher stresses at high speed, during hard braking, when the vehicle turns or when the tire hits a bump, curb or pot hole.

Monocast, aluminum wheels are popular for automobiles. Aluminum is a desirable material for vehicle wheels because it is light weight, can be cast into pleasing designs, resists corrosion, and is relatively strong for its weight. Aluminum automobile wheel rims have a minimum wall thickness that depends on the size of the wheel and weight of the vehicle. Through testing, both wheel and automobile manufacturers acknowledge that a 4.25 mm rim thickness yields a sufficiently strong rim for moderately heavy passenger cars.

Wheel rims have a region with generally uniform wall thickness. It is this region that maintains the minimum wall thickness (e.g., 4.25 mm). Decreasing that thickness while maintaining a sufficiently strong wheel would be desirable. Attempts to decrease that thickness while leaving a wheel with sufficient strength have been unsuccessful, however.

Weight reduction is the main advantage for decreased thickness. A thinner rim could save 0.2–0.5 lbs. (0.1–0.2 kg) per wheel—four times that per car. Although a weight savings of about a pound or half a kilogram might appear very modest at first glance, it can have dramatic effects. Heavier wheels have increased rolling momentum, which may cause the vehicle to be subjected to harmful vibrations and stress. Heavier wheels also require heavier frames, spring, shock absorbers and related parts. Thus, even a small savings in wheel weight may multiply into much greater overall vehicle weight savings.

Lighter vehicles (and decreased rolling momentum) gain increased fuel economy. Government standards mandate average fuel economy for automobile manufacturers. Many customers want larger or more powerful cars, which tend to use more gasoline per mile. If a manufacturer sells more large or high powered vehicles, its overall fuel economy may approach or exceed government standards. Accordingly, the manufacturers desire even modest weight reductions because they may allow a manufacturer to sell more large or powerful vehicles and stay below government standards.

Weight reduction also is important for race cars. Although the improvement that the present invention teaches is applicable to race car wheels, the exemplary embodiment that this application describes will be for passenger cars, light trucks, and multipurpose passenger vehicles.

The following references are examples of the state of the art.

| Name | Patent No. | Year |
|---|---|---|
| Nass | 3,635,529 | 1972 |
| Lester | 4,035,895 | 1977 |
| Davis | 4,071,280 | 1978 |
| Bonniwell et al. | 4,361,358 | 1982 |
| Rohr | 4,420,190 | 1983 |
| Zulauf | 4,487,456 | 1984 |
| Takada | 4,518,204 | 1985 |
| Kanazawa et al. | 5,292,182 | 1994 |
| Scott | 5,415,464 | 1995 |
| Baldi | 5,429,422 | 1995 |

Of these reference, Scott, U.S. Pat. No. 5,415,464, teaches the concept of material from an annular recess removal to reduce weight. Nass, U.S. Pat. No. 3,635,529 shows a wheel in which dimples pushed into a steel rim secure the rim to an alloy spider. The dimples secure the rim to the spider; they are not designed for weight reduction. Kanazawak, U.S. Pat. No. 5,292,182 teaches annular grooves in its rim. These grooves improve the casting process rather than reduce weight.

SUMMARY OF THE INVENTION

The principal objects of the present invention are to disclose and provide a vehicle wheel with a lighter weight rim which still has sufficient strength to allow it to withstand high loads. In order to resolve these problems, the new, lighter type of rim of the present invention has been designed.

The wheel has a hub and a rim extending circumferentially around the hub. A spider between the hub and rim support the rim. Spaced indentations in the rim remove material from the rim. By properly spacing the indentations and designing their shape, depth and size, one can remove significant amounts of material (e.g., 0.3–0.4 lbs. (0.14–0.18 kg)) from the rim without jeopardizing wheel strength.

In one embodiment, the indentations are grooves, which are aligned with the axis of the wheel and evenly spaced circumferentially about the wheel. The grooves have curved ends and a cross-section of an arc of a circle in that part of each groove that extends between the curved ends. The grooves extend into the rim to a depth dependent upon the details of a particular wheel and groove design. The radius of the circle that form the cross-section is much larger than the groove's depth. This causes the edges of the grooves to meet the rim surface at a gentle angle. The angle minimizes stress. The grooves may be in the rim's inner or outer surfaces or in both surfaces.

DETAILED DESCRIPTION OF THE PREFERRED EMBODIMENTS

Figure 1:
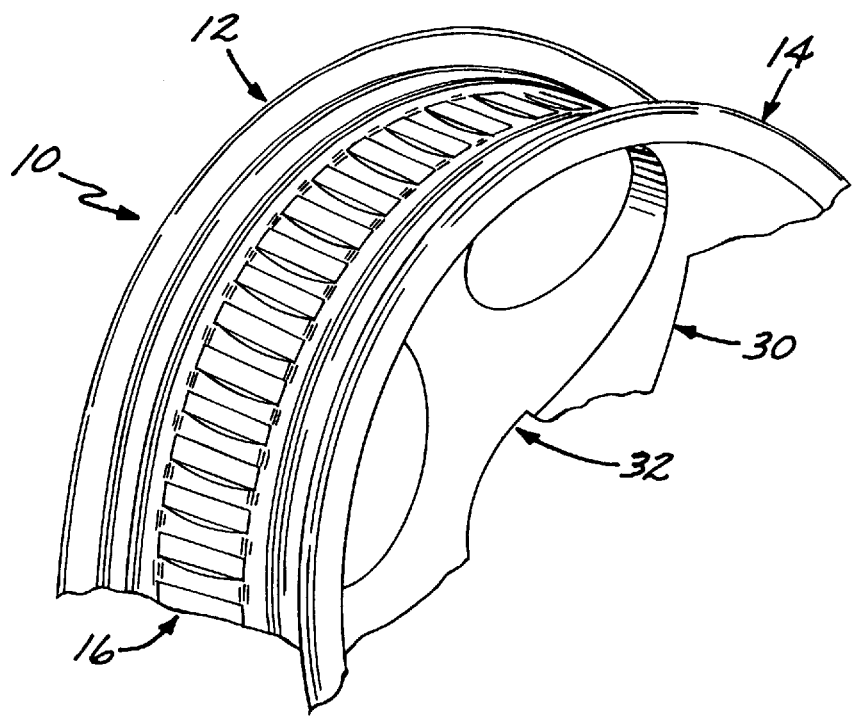
FIG. 1 is a perspective view of a section of an exemplary embodiment of a representative wheel using an example of the present invention's teachings.

The wheel 10 shown in the exemplary embodiment is designed for a 16×6.5 tire (not shown). Accordingly, the configuration for the size of the brakes and the wheel well dictate some of its design. The design of wheels that use the present invention's teachings will change for different vehicles and their tires.

Wheel 10 (FIGS. 1 and 2) has a inboard flange 12 (facing inward toward the center of a vehicle) and an outboard flange 14. Rim 16 extends between the flanges. As will be appreciated, rim 16 forms an annular shell extending about the longitudinal axis 36 of the wheel. The inboard rim of a tire (not shown) seats on the inboard bead seat 18 between inboard bead seat radius 20 and inboard hump 22. Likewise, the tire's outboard rim seats on the outboard bead seat 24 between outboard bead seat radius 26 and outboard hump 28.

A spider, spokes 30 in the exemplary embodiment, extends between the wheel hub 32 and rim 16. The exemplary spokes in FIG. 1 are radial. As is well known, many spider structures other than radial spokes can connect the hub and the rim.

Figure 2:
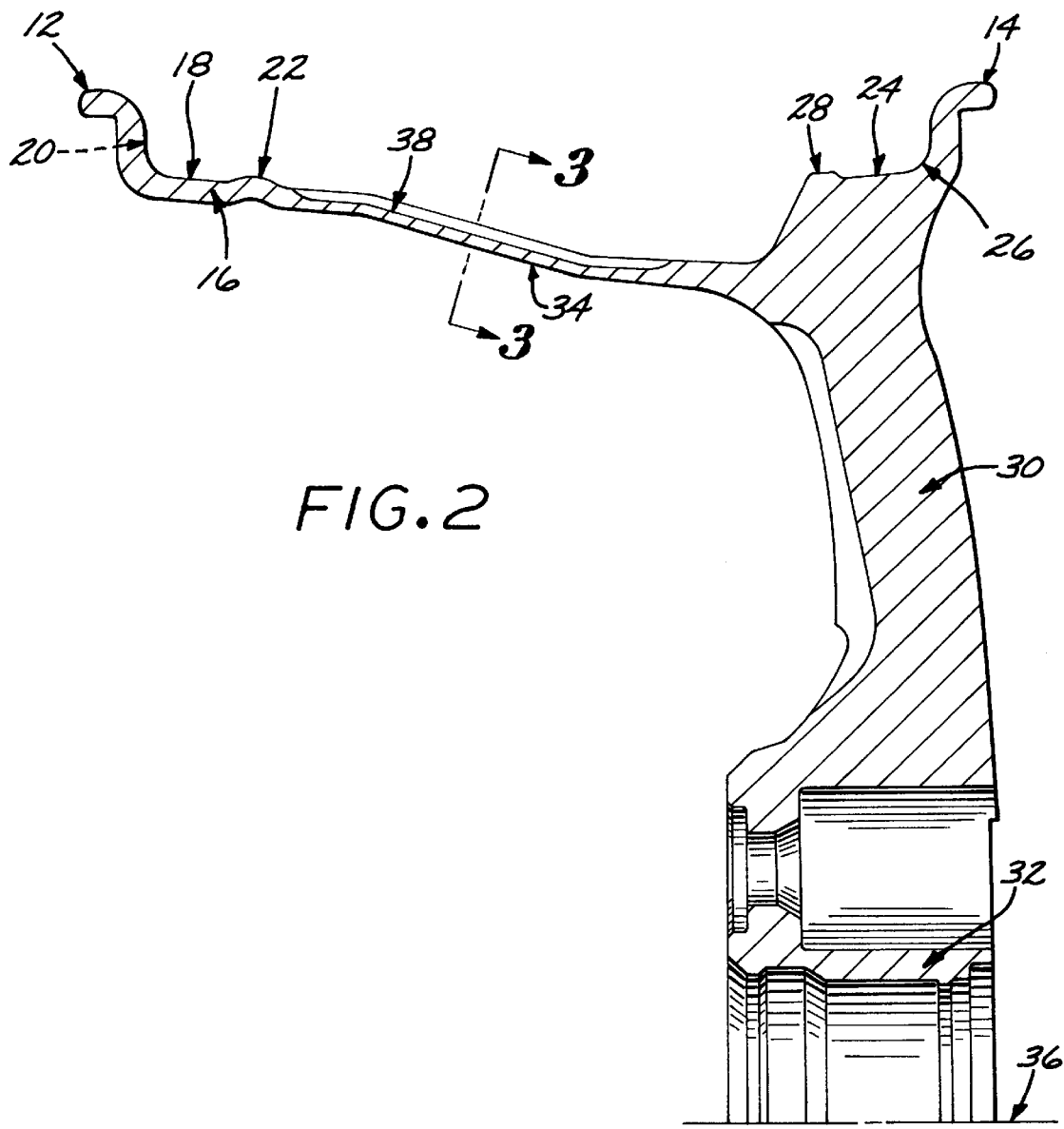
FIG. 2 is a broken, side sectional view of the upper half of the wheel shown in FIG. 1.

Typical wheels have a rim of constant thickness in the region 34 between the lines 11 and 13 in FIG. 2. That thickness may be as thin as 4.0 mm. In the exemplary embodiment, the thickness is 4.25 mm, and the region is about 67 mm long. The vehicle for which the wheel is designed is a relatively heavy one.

Rim 16 has a series of grooves or indentations in its surface. The series extends circumferentially around the rim. In the exemplary embodiment of FIGS. 1–3, the indentations are elongated grooves 38. The indentations have a maximum depth of 2.25 mm to provide the strength applicant desires. Therefore, because the nominal thickness of region 34 is 4.25 mm, at least 2.0 mm of aluminum remain.

Figure 3:
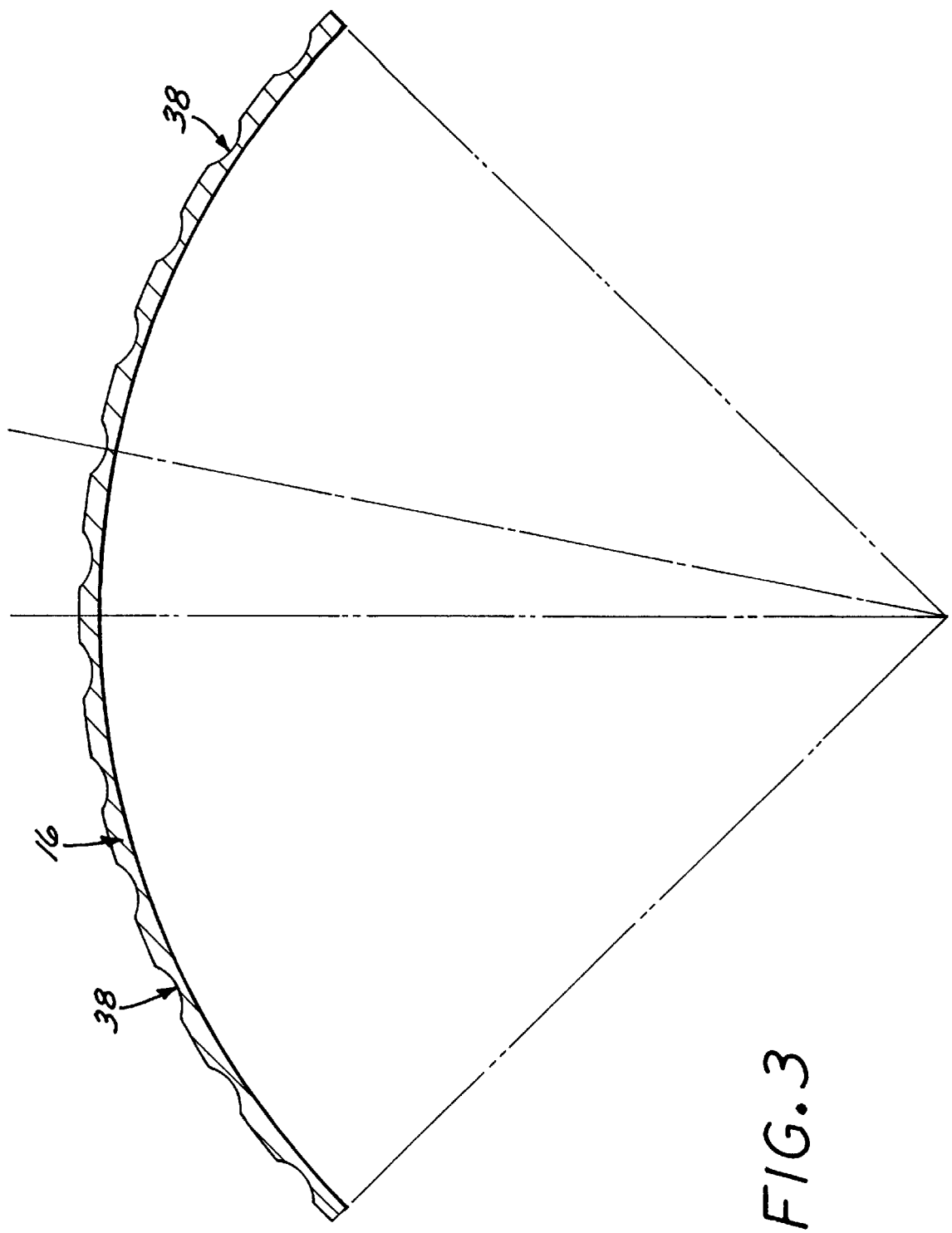
FIG. 3 is a partial sectional view taken through plane 3—3 of FIG. 2.

Wheel 10 has forty-eight grooves, which are evenly spaced 7.5° apart. As FIG. 3 shows, grooves 38 have a cross-section that is an arc of a circle. In the exemplary embodiment, the circle's radius is 11 mm. Thus, if the maximum depth of the groove is 2.25 mm, and the groove conforms to an 11 mm circle, the groove only extends about 20% of that circle's radius into the rim. This larger radius generates a gentle curvature for the intersection of the groove and the outer surface of the rim. Applicant believes that the gentle curvature minimizes stresses that a sharp angle would cause. The ends of grooves 38 also are curved. They utilize the same 11 mm radius curvature. Accordingly, stress is minimized at the ends of the grooves.

In the exemplary embodiment, the grooves are aligned with the wheel axis 36. Applicant contemplates that the grooves could be angled to the axis. Also, the grooves could have varying angles to each other.

Grooves 38 may be formed during the casting process. Alternatively, the grooves may be machined for more precise control of the shape and depth of each groove. Other processes, such as forging, can be used.

Each groove does not seem to account for removal of very much aluminum. Forty-eight such grooves per wheel can result in a 0.3–0.4 lb. weight loss, however. And the combined weight loss for all four whells can be about 1.5 lbs. (0.7 kg).

In the FIGS. 1–3 exemplary embodiment, all the grooves are on the outer surface of rim 16. The grooves also could be on the inner surface of the rim. The grooves also could alternate between the inside and outside surfaces of the rim. The FIGS. 4 and 5 embodiments show the latter arrangement. The outside grooves 42 in the outer surface 44 of the rim 40 are identical to the grooves in the FIGS. 1–3 embodiment. That is, each groove has a maximum depth of 2.25 mm. Each also is about 67 mm long. The rim has 48 outside grooves 42 each spaced 7.5° apart.

Figure 5:
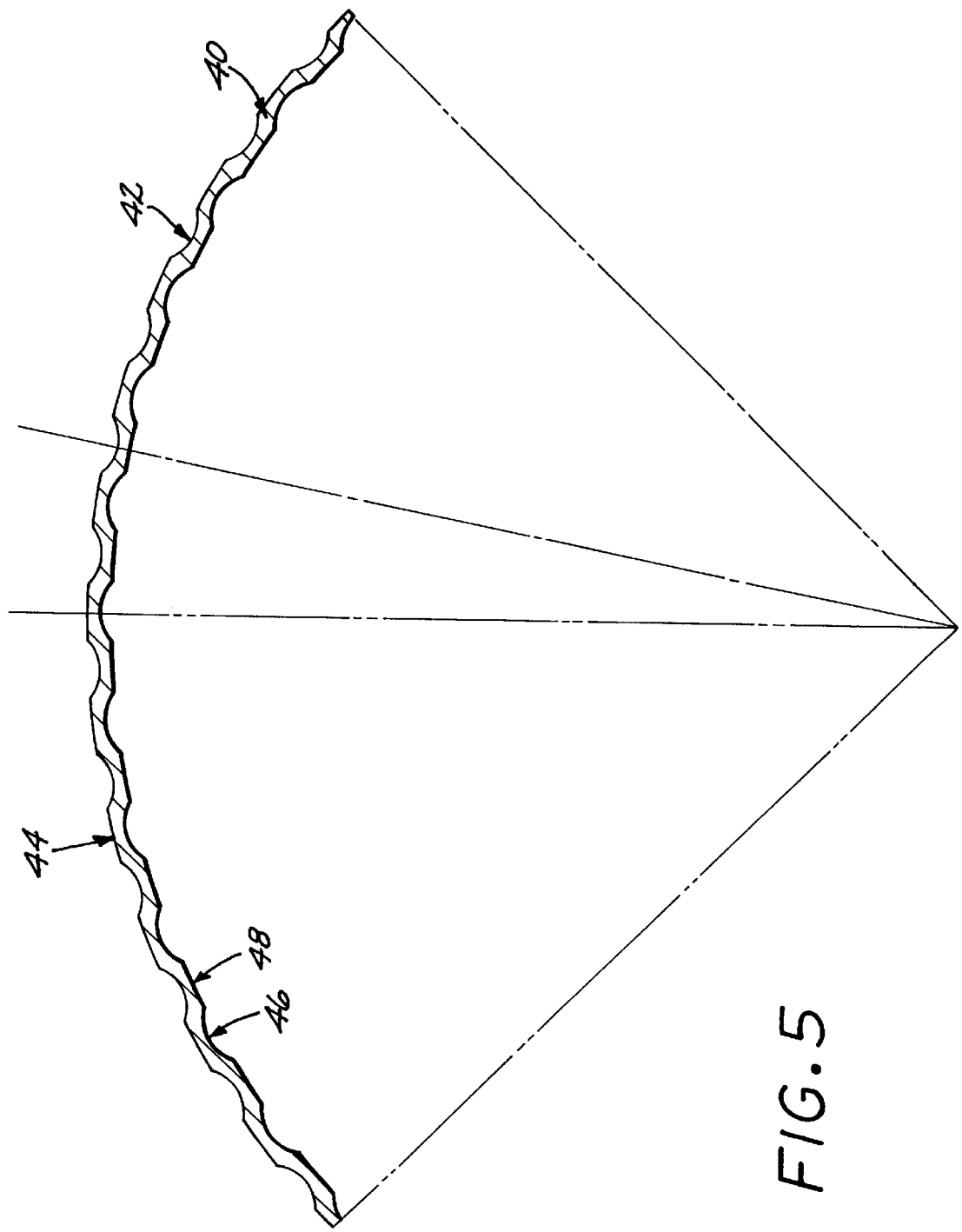
FIG. 5 is a partial sectional view taken through plane 5—5 of FIG. 4.

In this embodiment, the rim also has 48 inside grooves 46 on the inside surface 48 of rim 40. As FIG. 5 shows, the inside grooves are offset from the outside grooves. That is, the center of an outer groove 42 is 3.75° from the center of its adjacent inner groove 46.

Figure 4:
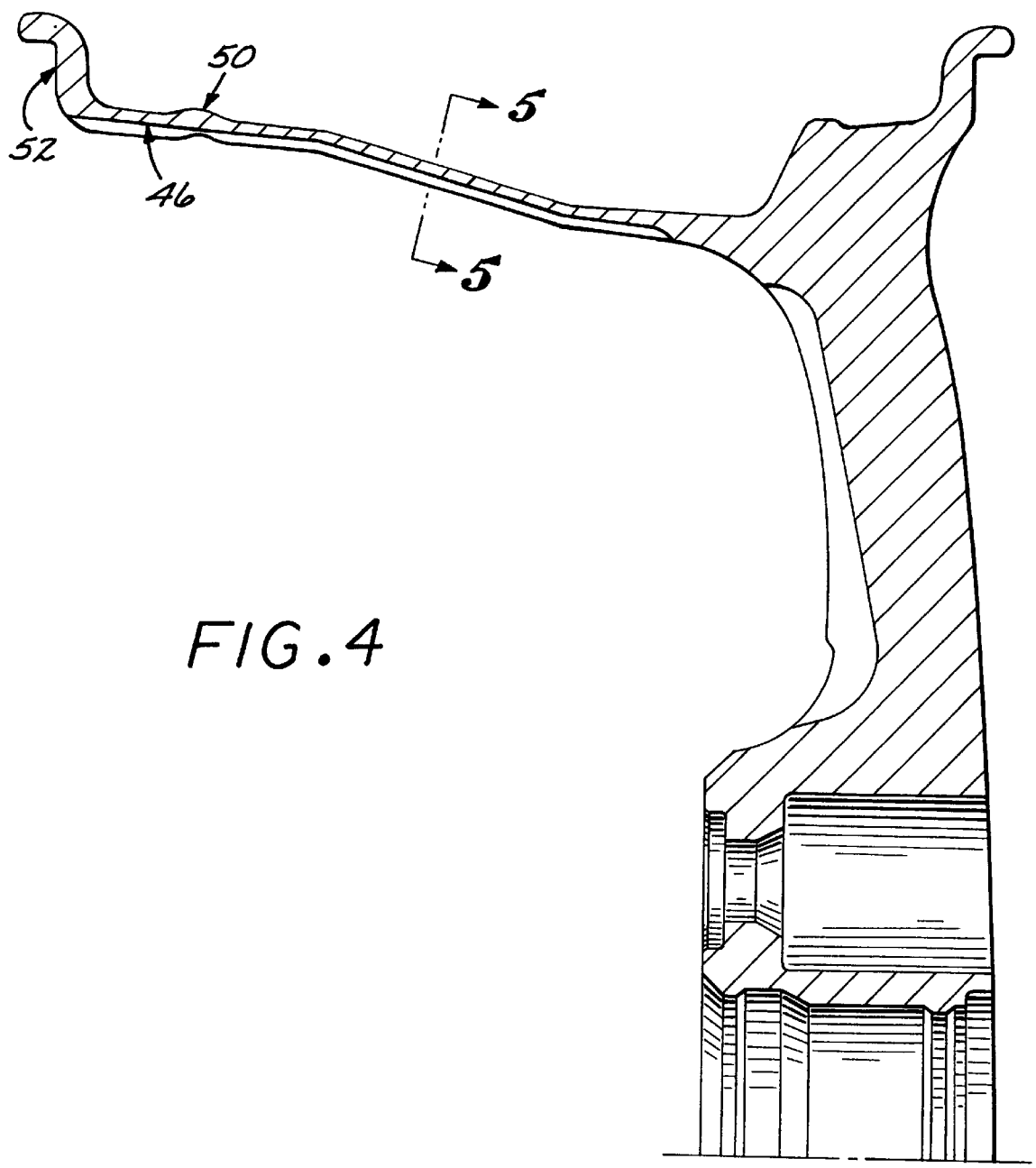
FIG. 4 is a side sectional view of part of the rim of an alternate embodiment of the wheel of the present invention.

The inner groove may be longer than the outer groove because the outer grooves must terminate before reaching inboard hump 50 (FIG. 4). In the exemplary embodiment, groove 46 is about 107 mm long. The inner grooves also are somewhat deeper, 2.34 mm, than the outer grooves, 2.25 mm. Both sets of grooves utilize the same 11 mm radius curvature. As FIG. 4 shows, the outboard end of groove 46 also terminates in an 11 mm radius curve. The inboard end, however, may continue straight until it ends at the upturned edge of inboard flange 52. Note that even though the inner grooves is somewhat deeper then the outer grooves, the inner grooves still only extend about 21% of their circular cross-section's radius into the rim. Therefore, the grooves' edges still make a gentle angle with the rim's surface.

Figure 8:
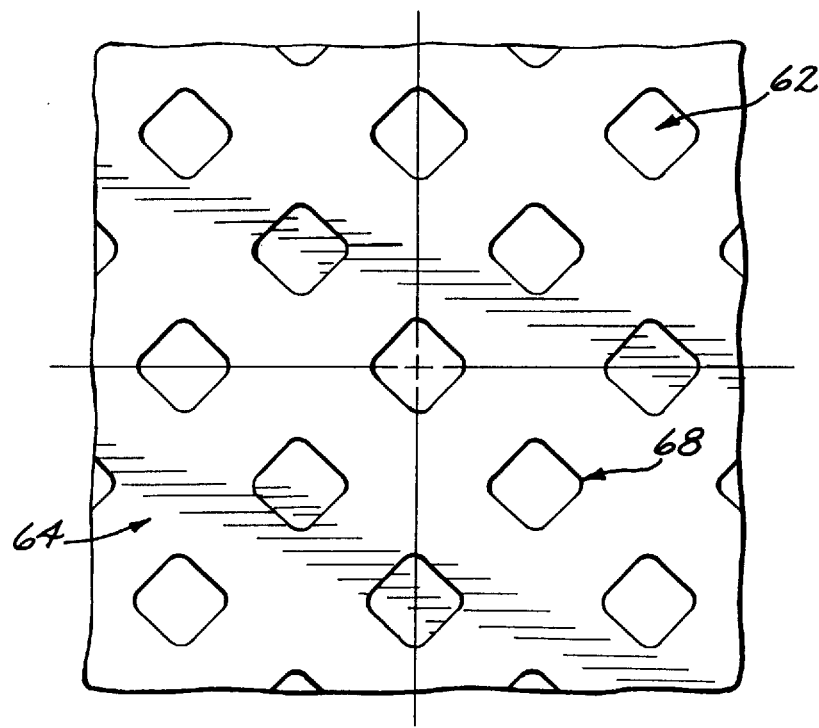
FIG. 8 is a partial top view of part of the rim of a second alternate embodiment of the wheel of the present invention.
Figure 6:
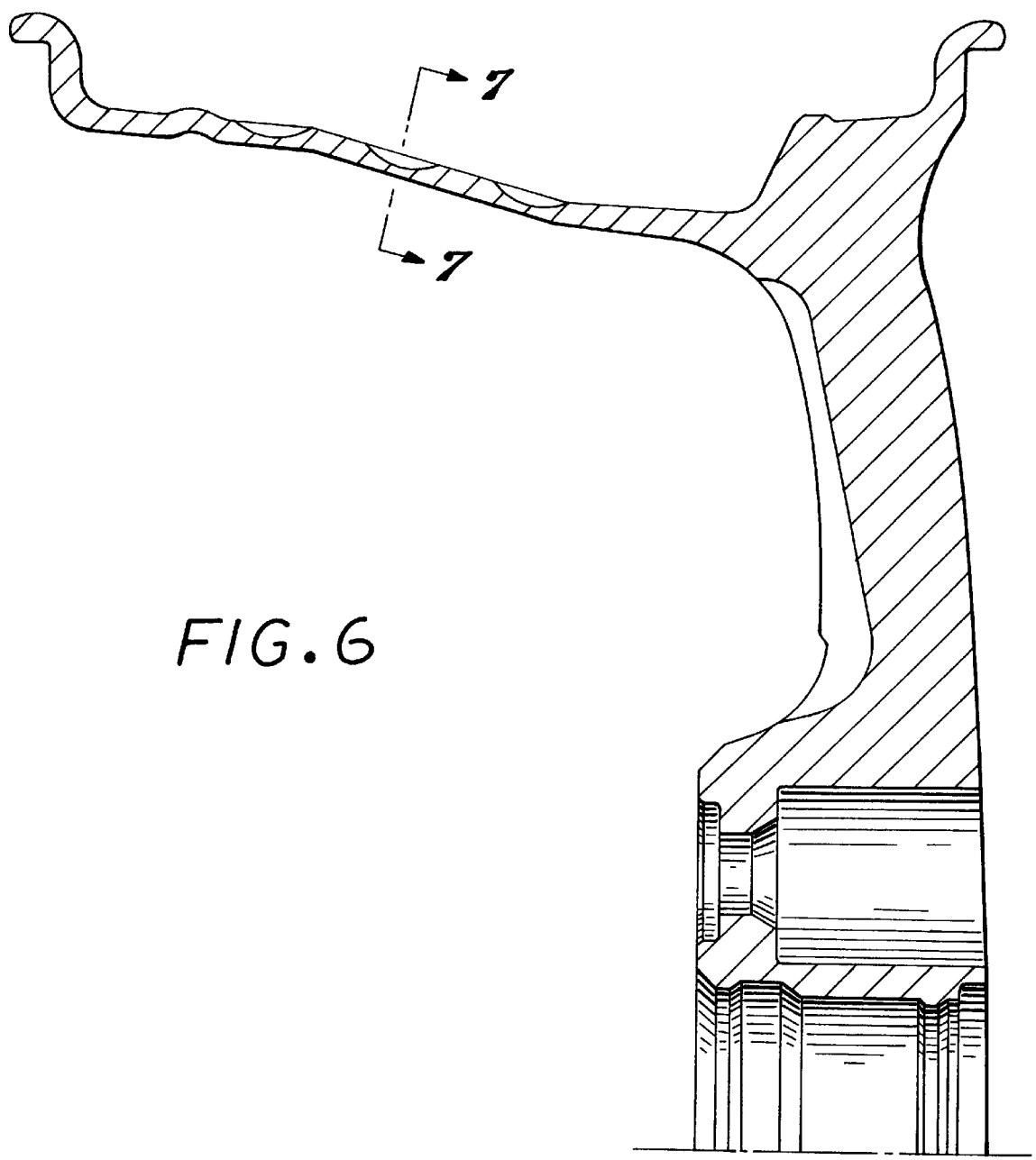
FIG. 6 is a side sectional view of part of the rim of a second alternate embodiment of the wheel of the present invention.
Figure 7:
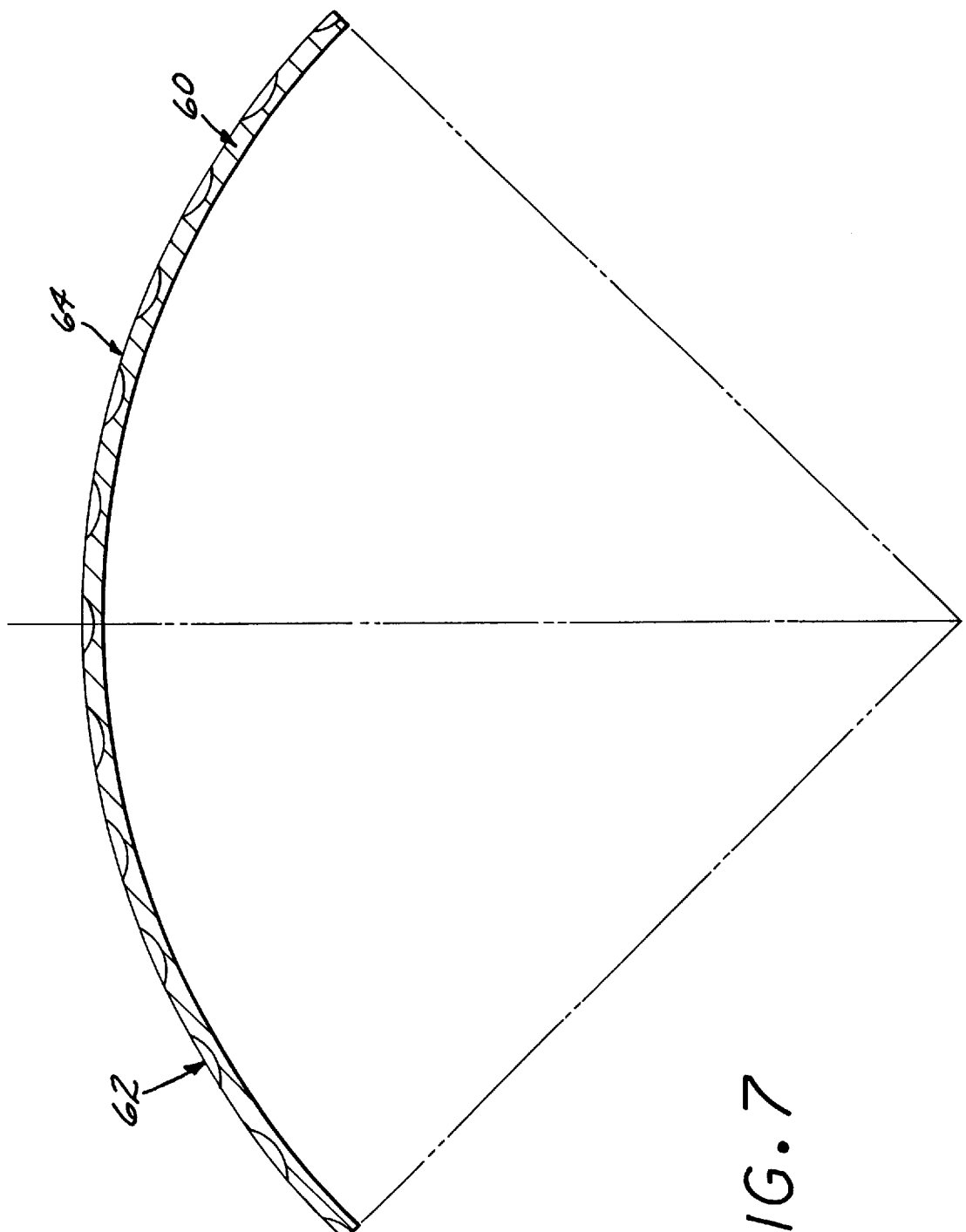
FIG. 7 is a partial sectional view taken through plane 7—7 of FIG. 6.

FIGS. 6, 7 and 8 show a third exemplary embodiment of the present invention. In this embodiment, spaced dimples replace the elongate grooves of earlier embodiments. Specifically, rim 60 has a series of dimples 62 in the outside surface 64 of the rim (FIG. 8). The dimples utilize an 11 mm radius curvature as FIGS. 6 and 7 show and extend to a 2.0 mm depth. Because region 68 (FIG. 6) has a nominal constant 4.25 mm thickness, 2.25 mm remains under each dimple. Corners 70 of each dimple are radiused with a 2 mm radius so that the dimples appear as rounded squares when viewed in FIG. 8.

The dimples are spaced circumferentially (i.e. "corner"-to-"corner") 7.5° apart. Therefore, any circumferential row has 48 dimples. The dimples have the same axial spacing. As FIG. 8 shows, rows of dimples are offset from each other so that each dimple's edges is closer to an adjacent dimple's edge than the "corner"-to-"corner" distance.

The FIGS. 6, 7 and 8 embodiments show the dimples only on the outside of the rim. Applicant contemplates that the inside of the rim could have dimples offset from the those on the outside of the rim.

Although applicant refers to grooves and dimples in the exemplary embodiments, the invention contemplates many other patterns for having material removed from the inner or outer surface of the rim. For example, the rim could have a square or cross-hatched ribbing. The rim could be 4.25 mm thick at the ribs and 2.25 mm thick in the spaces between the ribs. Various rim surface thicknesses and rib height can be used. Furthermore, instead of square ribbing, other shapes such as hexagons, triangles, rectangles, circles, and elliptical and other curved shapes, may be used. Applicant also contemplates that the ribs could have different shapes at the center of the rim than nearer the flanges. The ribs could be at different inclinations to the wheel axle and the rolling direction Ribs also can be on the outside, inside or on both the outside and inside of the rim. If the ribs are on the outside and inside, the ribs on one side may or may not be aligned with the ribs on the other side.

Although applicant's invention encompasses all shapes of grooves, ribs or similar structure, applicant believes that the exemplary embodiments shown in the drawings are preferred. The ribs described in the previous paragraph have sharp angles which concentrate stresses. Even grooved designs with steeper walls may concentrate stress too much.

Numerous modifications and alternate embodiments will occur to those skilled in the art. Therefore, applicant intends that the invention be limited only in terms of the appended claims.

I claim:

1. A generally cylindrical rim component of an automotive wheel having a tire-facing side and a brake-facing side, wherein said rim has a cantilevered edge supported from a spider extending radially outwardly from a central hub, comprising:

a smooth-faced tire seating surface circumferentially disposed near said edge of said rim; and an intermediate section extending between said tire seating surface and said spider for structurally supporting said surface, such section having formed its tire-facing side a repeating pattern of thickness variations so as to define axially extending ridges.

2. The rim component of claim 1 wherein said pattern of thickness variation defines grooves disposed between said ridges and wherein the cross-section of said grooves define an arc of a circle.

3. The rim component of claim 2 wherein the radius of said circle is larger than the depth of said grooves.

4. The rim component of claim 3 wherein said depth comprises about 20% of said radius.

5. The rim component of claim 1 wherein said thickness variations additionally define circumferentially extending ridges.

* * * * *